United States Patent
Gors

(10) Patent No.: US 7,521,817 B2
(45) Date of Patent: Apr. 21, 2009

(54) SYSTEM AND METHOD FOR REDUCING THE CHANCE OF FIRES AND/OR EXPLOSIONS

(76) Inventor: Donald Gors, 5701 N. Sheridan Rd., Chicago, IL (US) 60660

(*) Notice: Subject to any disclaimer, the term of this patent is extended or adjusted under 35 U.S.C. 154(b) by 303 days.

(21) Appl. No.: 11/416,948

(22) Filed: May 3, 2006

(65) Prior Publication Data
US 2007/0257557 A1 Nov. 8, 2007

(51) Int. Cl.
| | |
|---|---|
| *B60L 1/00* | (2006.01) |
| *A62C 3/07* | (2006.01) |
| *A01G 27/00* | (2006.01) |
| *B60K 28/12* | (2006.01) |
| *H01H 37/76* | (2006.01) |
| *F16D 1/09* | (2006.01) |
| *H01R 13/46* | (2006.01) |

(52) U.S. Cl. .......... 307/10.1; 169/62; 169/54; 169/56; 169/60; 239/67; 239/69; 180/283; 180/284; 180/285; 180/287; 337/415; 403/16; 174/60; 174/72 A; 307/9.1; 307/10.2

(58) Field of Classification Search .......... 169/62, 169/54, 56, 60; 239/67, 69; 180/283, 284, 180/285, 287; 307/10.1, 9.1, 10.2; 337/415; 403/16; 174/60, 72 A
See application file for complete search history.

(56) References Cited

U.S. PATENT DOCUMENTS

| | | | | |
|---|---|---|---|---|
| 774,611 A | * | 11/1904 | Sprague | 307/9.1 |
| 2,010,897 A | * | 8/1935 | Rodel | 200/61.48 |
| 2,842,630 A | * | 7/1958 | Lucibello | 200/61.45 R |
| 2,858,391 A | * | 10/1958 | Hinton | 200/61.52 |
| 3,198,899 A | * | 8/1965 | Hitchcock | 200/61.45 R |
| 3,259,202 A | * | 7/1966 | Griffeth | 180/283 |
| 3,410,359 A | * | 11/1968 | Mollison et al. | 180/283 |
| 3,465,827 A | * | 9/1969 | Shinbaum et al. | 169/61 |
| 3,515,218 A | * | 6/1970 | Lastinger et al. | 169/16 |
| 3,889,774 A | * | 6/1975 | Schwenk | 180/283 |
| 4,049,073 A | * | 9/1977 | Gebert | 180/283 |
| 4,194,571 A | * | 3/1980 | Monte | 169/61 |
| 4,195,897 A | * | 4/1980 | Plevjak | 439/507 |
| 4,310,817 A | * | 1/1982 | McNiel | 335/13 |
| 4,524,287 A | * | 6/1985 | Brannen | 307/10.1 |

(Continued)

*Primary Examiner*—Len Tran
*Assistant Examiner*—Steven Cernoch
(74) *Attorney, Agent, or Firm*—Cherskov & Flaynik

(57) ABSTRACT

A system 10 and method for reducing the possibility of fires and/or explosions when a vehicle impacts an object includes a cable connector 12 having a first portion 14 connected to an ungrounded terminal 20 of a battery 22 in the vehicle and a second portion 16 connected to all vehicle electrical components requiring power from battery 22, an inert gas canister 18 having an internal pressure that facilitates the separation of the first and second portions 14 and 16 of the cable connector 12 when predetermined conditions are satisfied, electric squib means 24 for initiating pressurized inert gas flow from the canister 18 to the first portion 14 of the cable connector 12, an accelerometer 28 for sensing impact between the vehicle and the object, and a microprocessor 30 for signaling the accelerometer 28 to "fire" the squib means 24 when the magnitude of impact requires an inert gas flow to the first portion 14 whereby the second portion 16 is forcibly ejected from the first portion 14 and the area adjacent to the first portion 14 is blanketed with inert gas thereby reducing the possibility of fire and/or explosion resulting from fuel vapors engaging electrical arcs or vehicle "hot spots."

24 Claims, 10 Drawing Sheets

U.S. PATENT DOCUMENTS

| | | | |
|---|---|---|---|
| 4,646,848 A * | 3/1987 | Bruensicke | 169/62 |
| 4,812,670 A * | 3/1989 | Goulet | 307/10.2 |
| 5,389,824 A * | 2/1995 | Moroto et al. | 307/10.1 |
| 5,481,139 A * | 1/1996 | Lucas | 307/9.1 |
| 5,574,316 A * | 11/1996 | Nieschulz | 307/10.7 |
| 5,990,572 A * | 11/1999 | Yasukuni et al. | 307/10.1 |
| 6,182,714 B1 * | 2/2001 | Ginsburgh et al. | 141/63 |
| 6,513,602 B1 * | 2/2003 | Lewis et al. | 169/84 |
| 2001/0015883 A1 * | 8/2001 | Nakamura et al. | 361/170 |
| 2005/0093371 A1 * | 5/2005 | Zdziech et al. | 307/10.1 |
| 2005/0139363 A1 * | 6/2005 | Thomas | 169/30 |

* cited by examiner

SYSTEM AND METHOD FOR REDUCING THE CHANCE OF FIRES AND/OR EXPLOSIONS

BACKGROUND OF THE INVENTION

1. Field of the Invention

The present invention relates to a system and method for reducing the possibility of a fire started from an electrical arc, and more particularly, to a system and method for disconnecting a D.C. or A.C. power source from an electrical system or preselected electrical components of a vehicle while maintaining power to safety electrical components including the present invention, and at the same time blanketing the area adjacent to the battery with inert gas thereby reducing the chance of a fire and/or explosion.

2. Background of the Prior Art

Systems and methods for reducing the possibility of fires and/or explosions started by electrical arcs resulting from moving vehicles impacting object including automobile accidents are well known. Generally, the systems and methods disconnect the power cable from the battery via springs, pyrotechnic propellant, relays and/or diodes among other components, to electrically isolate the battery thereby de-energizing the vehicle's electrical distribution system and connected components. Most of the prior art systems and methods do not maintain power to safety electrical equipment such as satellite monitoring systems that determine the location of a vehicle. Systems and methods for reducing the possibility of fires and or explosions by utilizing inert gas to blanket an area thereby disbursing flammable vapors are also well known.

The problem with the prior art is that there are is no single system or method that both prevents electrical arcs and that blankets a predetermined area with inert gas to reduce the chance of fires and/or explosions. Further, there is no prior art system or method that utilizes the pressure of the inert gas to force apart an electrical component to isolate an electrical power source to reduce the chance of fires and/or explosions. Thus, there is no prior art method or system that prevents electrical arcs and that distributes inert gas via the same components.

When a vehicle impacts and object, components required to prevent or reduce the chance of fire can be damaged resulting in system failure and an automotive fire and/or explosion. The more components utilized for fire prevention, the greater the possibility of system failure due to one or more of the components being damaged. Further, the more components utilized for fire prevention, the longer the response time for the fire prevention system to react after vehicle impact. A forceful vehicle impact of great magnitude may render a long response time thereby rendering the fire prevention system ineffective. Also, the fire prevention system or method must be inexpensive and easy to install, otherwise, market economics will dissuade the installation of the system or method into the vehicle.

A need exists for a system and method for reducing the possibility of fires and/or explosions when a vehicle impacts an object; the system and method including a minimum number of components, wherein one member (a cable connector) disconnects the battery in an inert gas environment while disbursing inert gas which blankets an area proximate to the battery. Further, the system and method should be quick to respond, reliable in operation, relatively inexpensive and easy to install.

SUMMARY OF THE INVENTION

It is an object of the present invention to overcome many of the disadvantages associated with reducing the possibility of fires and/or explosions when a vehicle impacts an object.

A principle object of the present invention is to provide a system and method that disconnects a battery from preselected vehicle electrical components when the vehicle impacts an object. A feature of the system and method is a cable connector with first and second portions that are forcibly separated by inert gas. Another feature of the system and method is to disposed the cable connector adjacent to the automotive battery or battery mounting assembly. An advantage of the system and method is that only a relatively short cable connecting the battery to the first portion of the cable connector, and the first portion remain energized after the vehicle impacts an object thereby preventing electrical arcs or "hot spots" caused by increased electrical current that might ignite a fire or cause and explosion should fuel be present due to ruptured fuel lines or fuel tanks, or due to the presence of explosive vapors.

Another object of the present invention is to provide a system and method that "blankets" (displaces fuel vapors and oxygen that would otherwise be present which increases the possibility of starting a fire or causing an explosion) the area proximate to the first portion with inert gas. A feature of the system and method is one or more pressurized inert gas containers or canisters with a relatively large gas volume and low pressure, or canisters with a relatively small gas volume at a relatively high pressure. Another feature of the system and method is two inert gas conduits that supply inert gas from the pressurized containers into respective outer recesses in the first portion of the cable connector. An advantage of the system and method is that the inert gas pressure urged upon two opposing portions of the second portion facilitates the ejection of the second portion of the cable connector from the first portion. Another advantage of the system and method is that the volume of inert gas facilitates the blanketing of the area adjacent to the energized first portion that might otherwise produce an arc which would start a fire or cause an explosion should fuel be present. Yet another advantage of the system and method is that volume of inert gas facilitates the blanketing of areas adjacent to hot portions (i.e. exhaust pipes) of the vehicle engine thereby reducing the chance of a fire or explosion by displacing fuel vapors and oxygen that might otherwise be present.

Yet another object of the present invention is to provide a system that prevents an electrical arc from emitting from the electrically energized first portion after the second portion has been ejected therefrom. A feature of the system is a recessed electrical receptacle in the first portion that has a first end integrally joined to a cable from the battery, and an opposing second end that removably receives an electrically conductive rod disposed in a recess in the second portion. Another feature of the system is recessed guide fingers in the first portion that promote a spark suppression cavity in the first portion. Yet another feature of the system is spark suppression apertures disposed transversely through the guide fingers and recessed electrical receptacle to promote the flow of inert gas from the inert gas conduits into the recessed electrical receptacle during the forceful separation of the first and second portions. An advantage of the system is that in the event the vehicle is damaged such that grounded vehicle portions engage the end of the first portion, the electrically energized recessed electrical receptacle does not engage the grounded vehicle portions thereby preventing an electrical arc that could start a fire should fuel vapors and oxygen be present. Another advantage of the system is that the spark suppression cavity and spark suppression apertures cooperate to provide inert gas to an electrical arc formed during the separation of the recessed electrical receptacle and the conductive rod; the inert gas being provided to extinguish or "quench" the arc before the first and second portions are separated, thereby further reducing the chance of a fire or explosion by removing an ignition source before exposing the recessed electrical receptacle and conductive rod to a volatile gas or liquid.

Still another object of the present invention is to provide a system that uniformly distributes ejection force from the first portion to the second portion. A feature of the system is two conduits that are joined and tightly sealed to the first portion, the two conduits being disposed adjacent to corresponding outer recesses in the first portion. Another feature of the system is that the outer recesses are disposed on opposing sides of the recessed electrical receptacle and are configured to snugly receive cooperating plugging fingers of the second portion. An advantage of the system is that ejection force is symmetrically applied to the second portion on opposite sides of the electrically conductive rod which snugly inserts into the recessed electrical receptacle in the first portion thereby completely separating the second portion from the first portion when the vehicle impacts an object.

Another object of the present invention is to provide a system capable of completely separating the first and second portions of the cable connector when the plugging fingers are snugly inserted into the outer recesses, and when the electrically conductive rod is snugly inserted into the recessed receptacle. A feature of the system is outer recesses with diameters relatively larger than the diameters of the conduits supplying inert gas thereto. Another feature of the system is concave or arcuate end walls of the plugging fingers that form a gap between an inner wall of the outer recesses and the plugging fingers. An advantage of the system is that increased force can be applied to the concave end walls of the plugging fingers to completely eject the second portion from the first portion thereby de-energizing the second portion and all electrical components connected thereto when the vehicle impacts an object. Another advantage of the system is that inert gas is allowed to flow from the first portion unrestricted by the second portion thereby blanketing the adjacent area more quickly and reducing the possibility of a fire starting.

Another object of the present invention is to provide a system that prevents conductive wires in the first and second portions from being pulled from or otherwise damaging the first and/or second portions as the first and second portions are forcibly joined or forcibly separated. A feature of the system is an enlarged end portion of the conductive wire in the first portion. Another feature of the system is an enlarged electrically conductive coupling disposed in the second portion, the coupling having a first end joined to the rod and a second end joined to the conductive wire. An advantage of the system is that the enlarged end portion of the wire and the enlarged coupling form retaining ridges that maintain the positions of the wires in the first and second portions irrespective of the joining or separation forces applied to the first and second portions.

Briefly, the invention provides a system for reducing the chance of fire and/or explosion when a vehicle impacts an object comprising a cable connector having first and second portions that separate when predetermined conditions are satisfied; a pressurized container of inert gas that promotes the separation of said first and second portions of said cable connector, said first portion being connected to the ungrounded terminal of a battery in the vehicle; means for sensing impact between the vehicle and the object, means for extinguishing an electrical arc in said first portion of said cable connector during separation of said first and second portions; and means for initiating inert gas flow from said pressurized container to said cable connector whereby said first and second portions of said cable connector are separated a distance sufficient to interrupt electrical current, said inert gas flow continuing until said container supplying said inert gas depressurizes thereby reducing the possibility of fire and/or explosion by blanketing the area adjacent to said first portion of said cable connector with inert gas.

The invention further provides a system for disconnecting an electrical power source in a moving vehicle when the moving vehicle is involved in a collision with an object comprising a cable connector having first and second portions that separate when predetermined conditions are satisfied, said first portion being connected to the ungrounded terminal of an electrical power source; means for sensing a predetermined magnitude of impact of a moving vehicle with an object; and means for initiating inert gas flow from an inert gas container to said first portion of said cable connector when a predetermined magnitude of impact is sensed whereby said first and second portions of said cable connector separate such that electrical arcs are extinguished and an adjacent area is blanketed with inert gas resulting in reducing the possibility of a fire and/or explosion that may occur when a moving vehicle is involved in a collision.

The invention also provides a method for reducing the possibility of fire and/or explosion when a vehicle is involved in a collision, said method comprising the steps of providing a cable connector having first and second members that are initially joined together, said first member being electrically connected to an ungrounded terminal of a battery; providing means for forcibly separating said first and second members; measuring the magnitude of force generated by a collision between a vehicle and an object; initiating the forcible separation of said first and second members when said measured magnitude of force reaches a predetermined magnitude; isolating an electrically energized portion of said first member to prevent electrical arcing after the automobile engages an object; and blanketing the region proximate said first member with inert gas whereby the possibility of fires and/or explosions are reduced in the event fuel engages a hot spot.

BRIEF DESCRIPTION OF THE DRAWINGS

These and other objects, advantages and novel features of the present invention, as well as details of an illustrative embodiment thereof, will be more fully understood from the following detailed description and attached drawings, wherein:

FIG. 1 includes a front sectional view of a cable connector with separated first and second portions in accordance with the present invention.

DESCRIPTION OF THE PREFERRED EMBODIMENT

Figure 1:
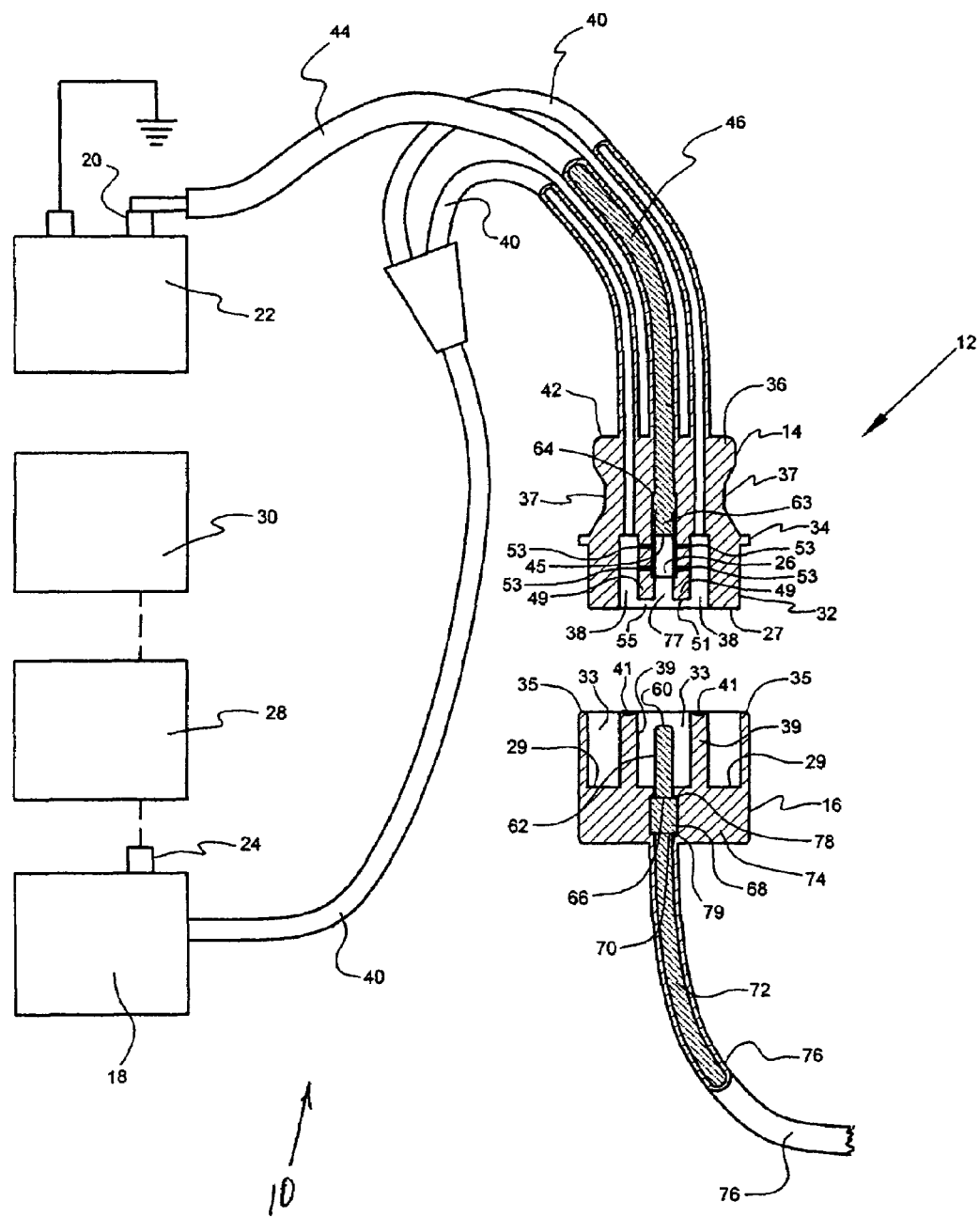
FIG. 1 is a block diagram of a system and method for reducing the possibility of fires and/or explosions when a vehicle impacts an object in accordance with the present invention.
Figure 2:
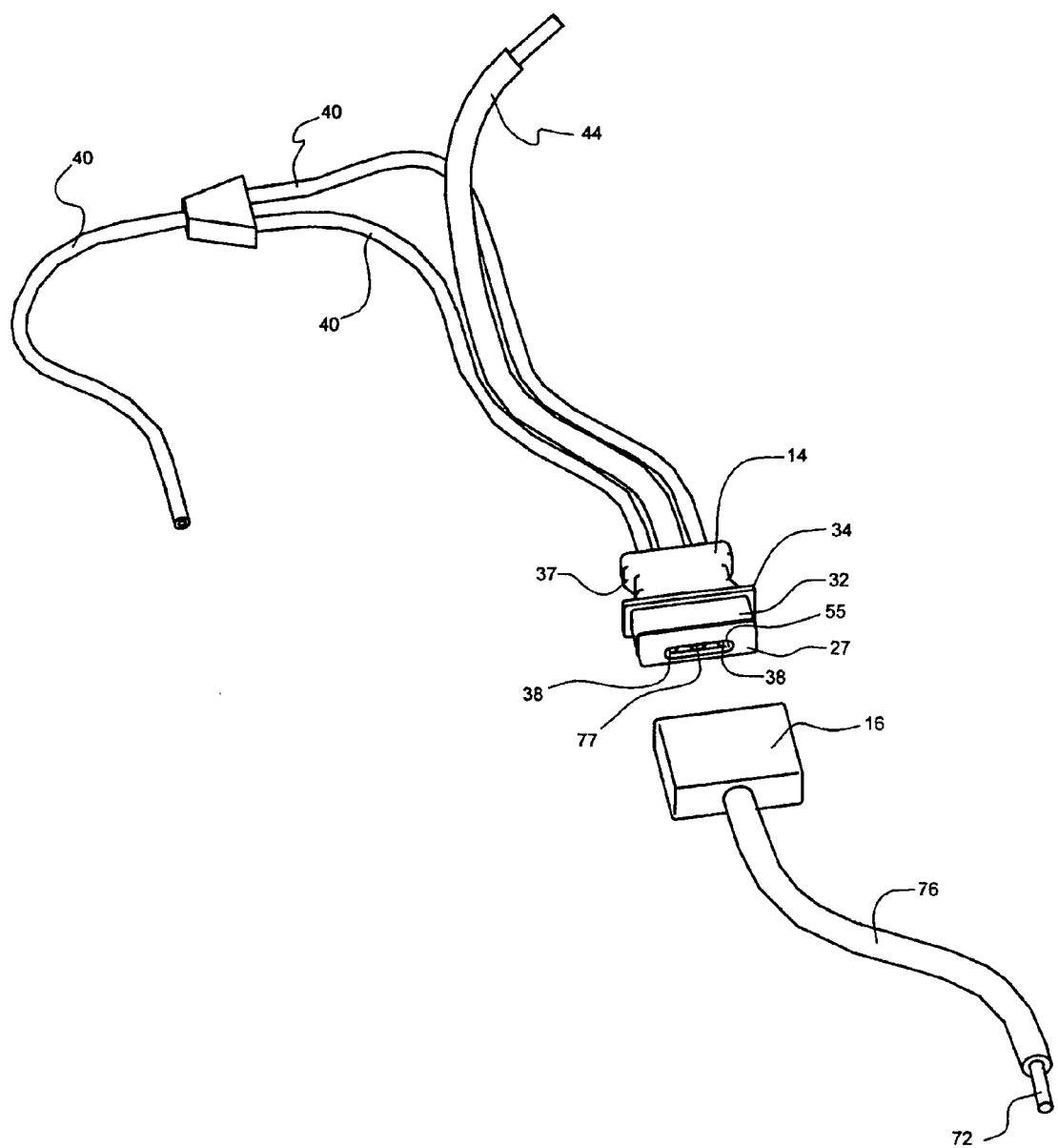
FIG. 2 is a perspective view of the cable connector, wire and conduits of FIG. 1.
Figure 3:
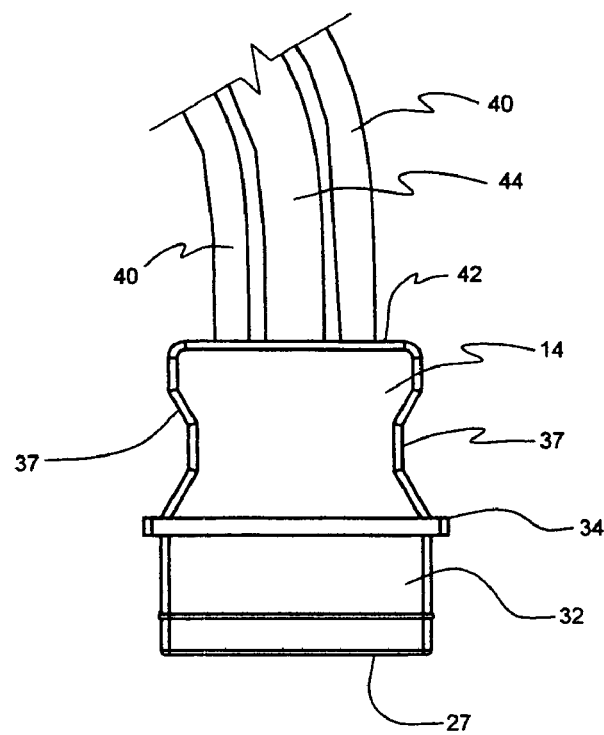
FIG. 3 is a front elevation view of the cable connector of FIG. 2.
Figure 3:
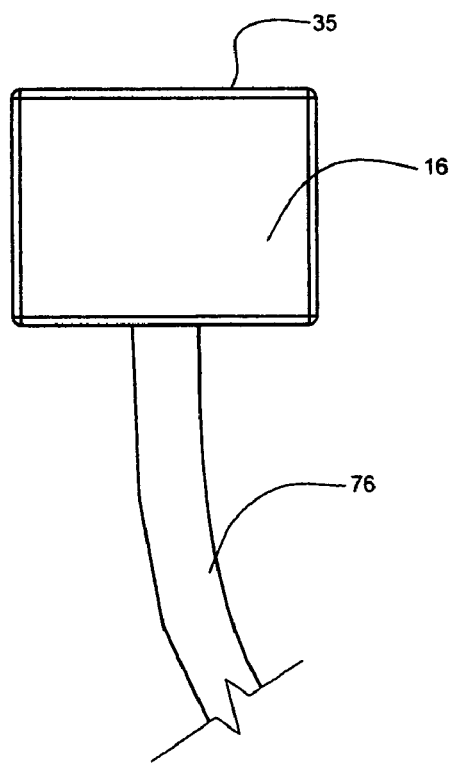
Figure 4:
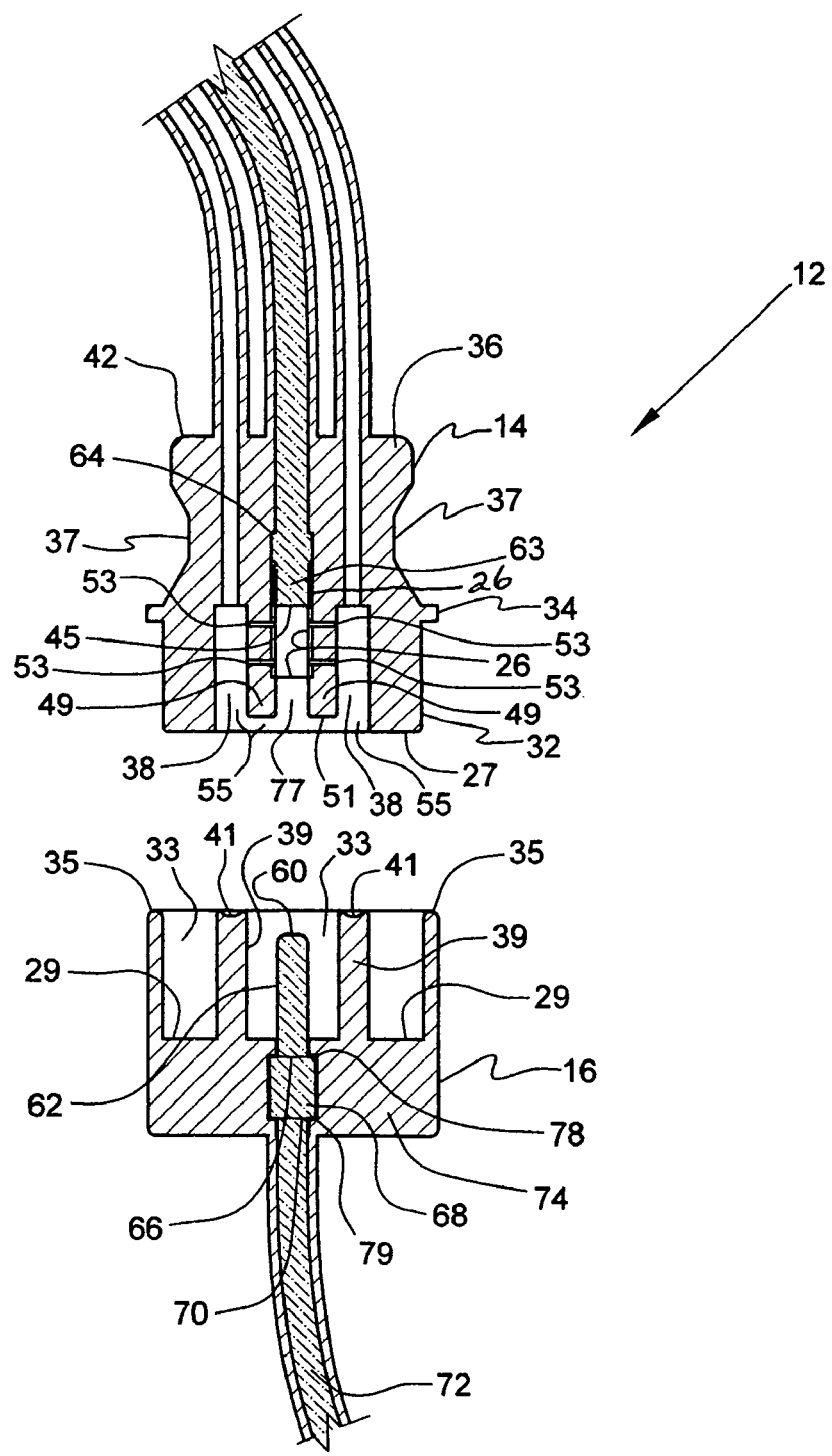
FIG. 4 is a front sectional view of the cable connector of FIG. 3.
Figure 5:
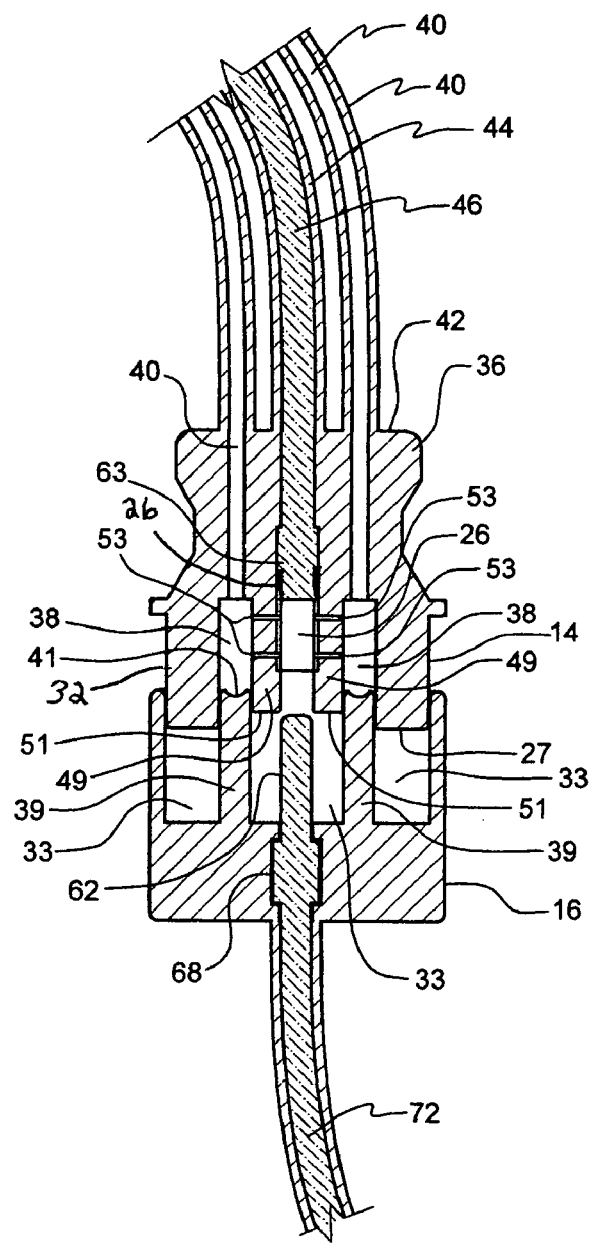
FIG. 5 is a front sectional view of the cable connector of FIG. 4, but with the first portion partially inserted into the second portion in accordance with the present invention.
Figure 6:
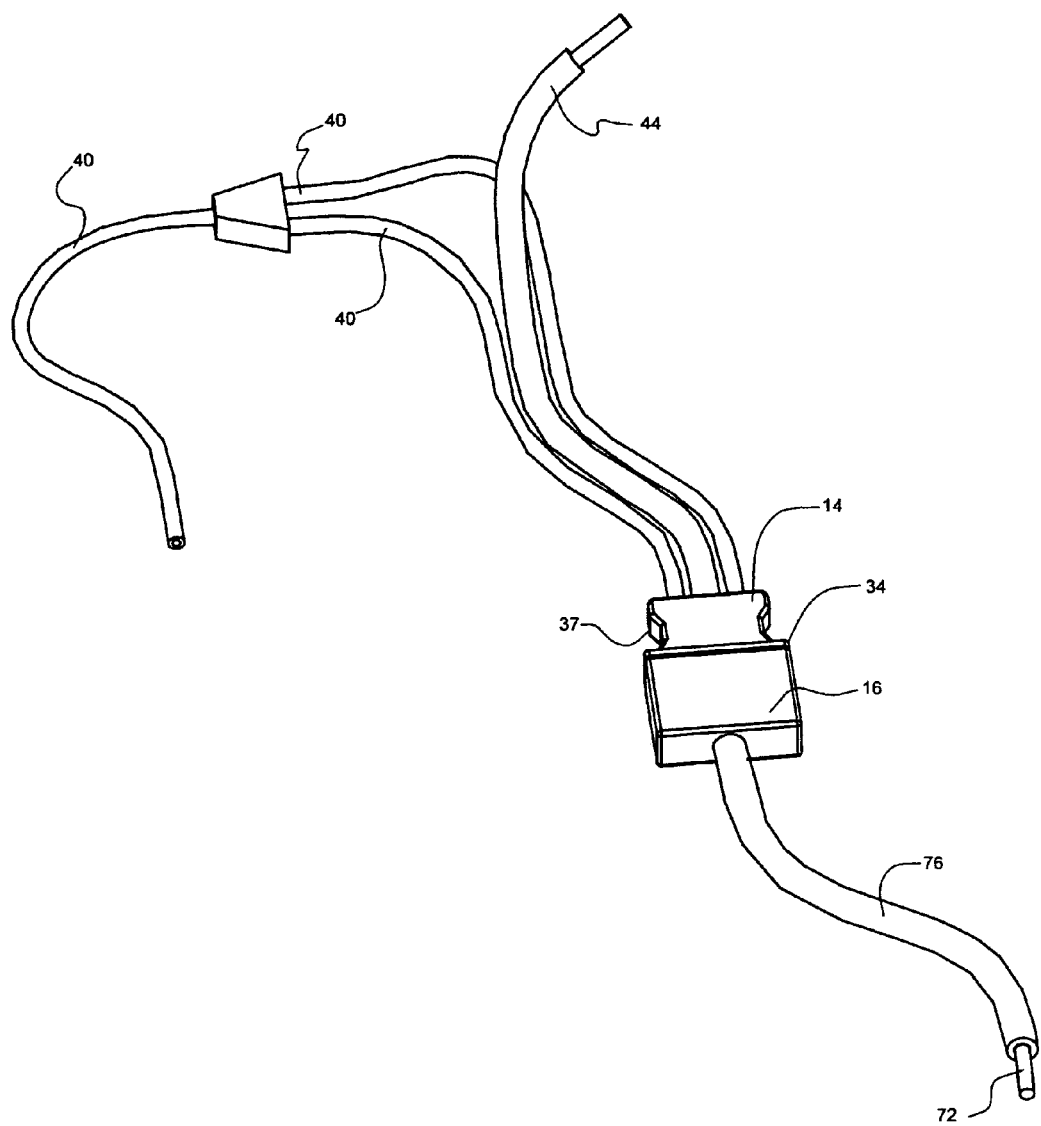
FIG. 6 is a perspective view of the cable connector of FIG. 2, but with the first portion completely inserted into the second portion in accordance with the present invention.
Figure 7:
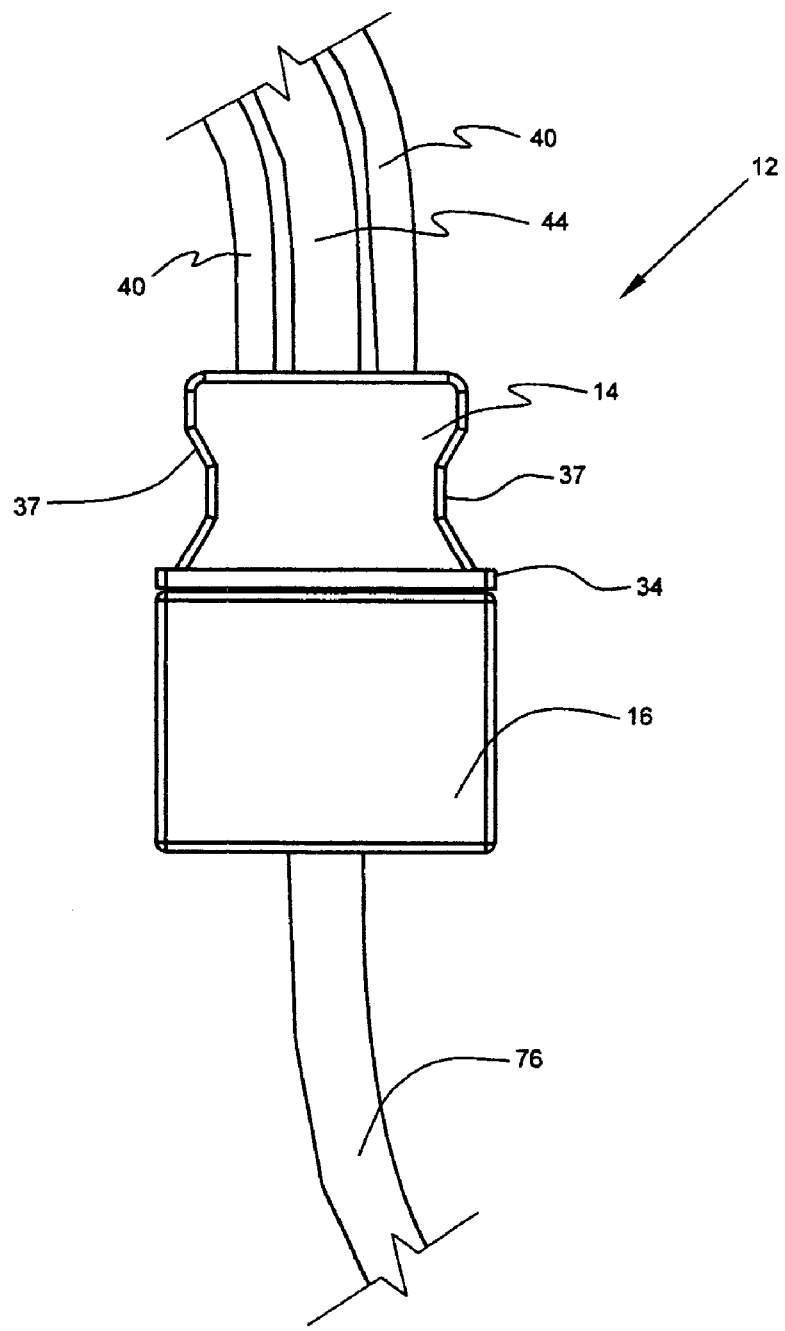
FIG. 7 is a front elevation view of the cable connector of FIG. 3, but with the first portion completely inserted into the second portion in accordance with the present invention.

Referring now to the drawings, a system for reducing the possibility of fire and/or explosion when a vehicle impacts an object in accordance with the present invention is denoted as numeral 10. The system 10 includes a connector 12 having a first portion 14 connected to an ungrounded terminal 20 of a typical vehicle battery 22 or similar electrical power source for a vehicle (not depicted), and a second portion 16 connected to all vehicle electrical components requiring power from the power source 22; one or more inert gas canister 18 having an internal pressure that facilitates the separation of the first and second portions 14 and 16 of the connector 12 and that blankets an area adjacent to the connector 12 with inert gas when predetermined conditions are satisfied. The first portion 14 is connected to the ungrounded terminal 20 of a battery 22 in the vehicle.

The system 10 further includes electric squib means 24 for initiating pressurized inert gas flow from the canister 18 to the first portion 14 of the cable connector 12; a cylindrical electrical receptacle 26 recessed in the first portion 14, the receptacle 26 includes an inner cavity 94 that removably receives a cooperating rod 62 of the second portion 16, the recessed receptacle 26 promoting the extinguishing of an electrical arc formed during separation of the first and second portions 14 and 16, or formed when the first portion 14 of the cable connector 12 engages a grounded portion of the vehicle after complete separation of the first and second portions 14 and 16; an accelerometer 28 for sensing impact between the vehicle and the object, the accelerometer 28 providing an electric signal when a predetermined magnitude of impact is sensed; and a microprocessor 30 that receives the electric signal from the accelerometer 28 and determines if the magnitude of impact between the vehicle and the object requires inert gas flow from the canister 18 to the cable connector 12. Although the drawings depict the preferred structure of the cable connector 12 as having a first "female" portion 14 receiving a second "male" portion 16 thereby facilitating the separation of energized metal portions in the first portion 14 from grounded portions of a damaged vehicle, the cable connector 12 may include a first male portion 14 inserting into a second female portion 16 by simply reversing the designs of the depicted first and second portions 14 and 16.

Figure 8:
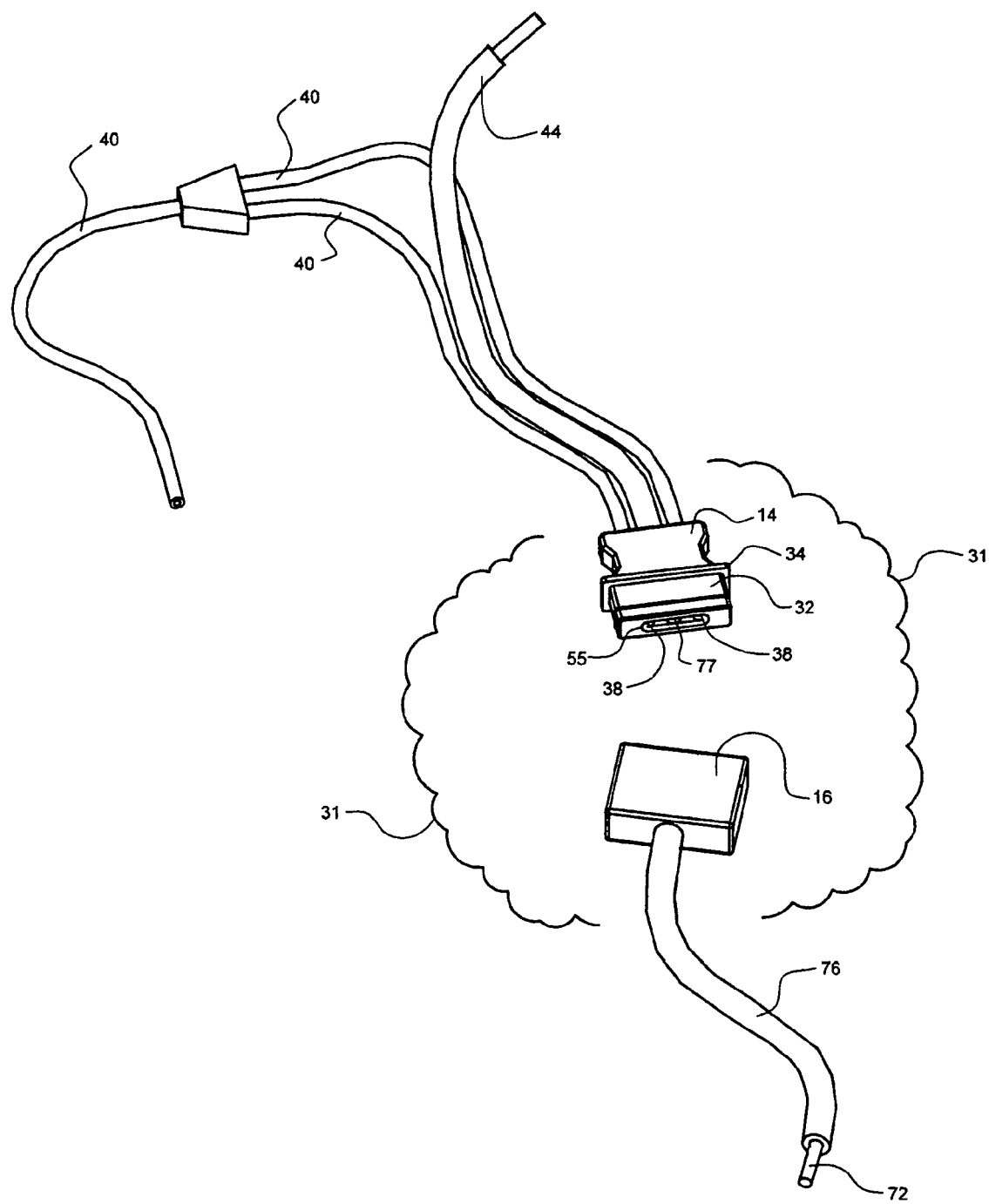
FIG. 8 is a perspective view of the cable connector of FIG. 2, but with the second portion ejected from the first portion via inert gas, and with the inert gas blanketing an area adjacent to the first portion in accordance with the present invention.
Figure 9:
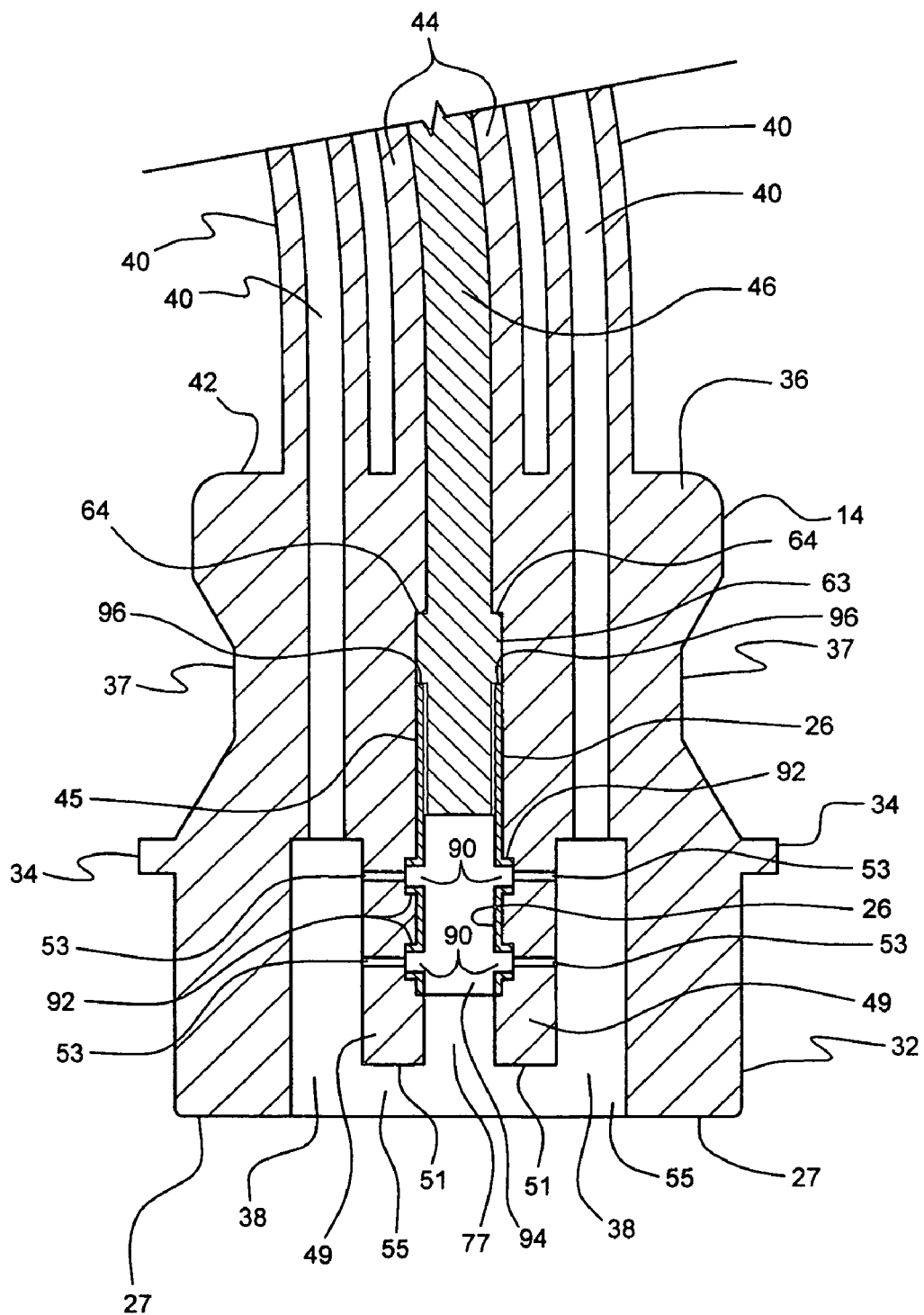
FIG. 9 is an enlarged front sectional view of the first portion of the cable connector.
Figure 10:
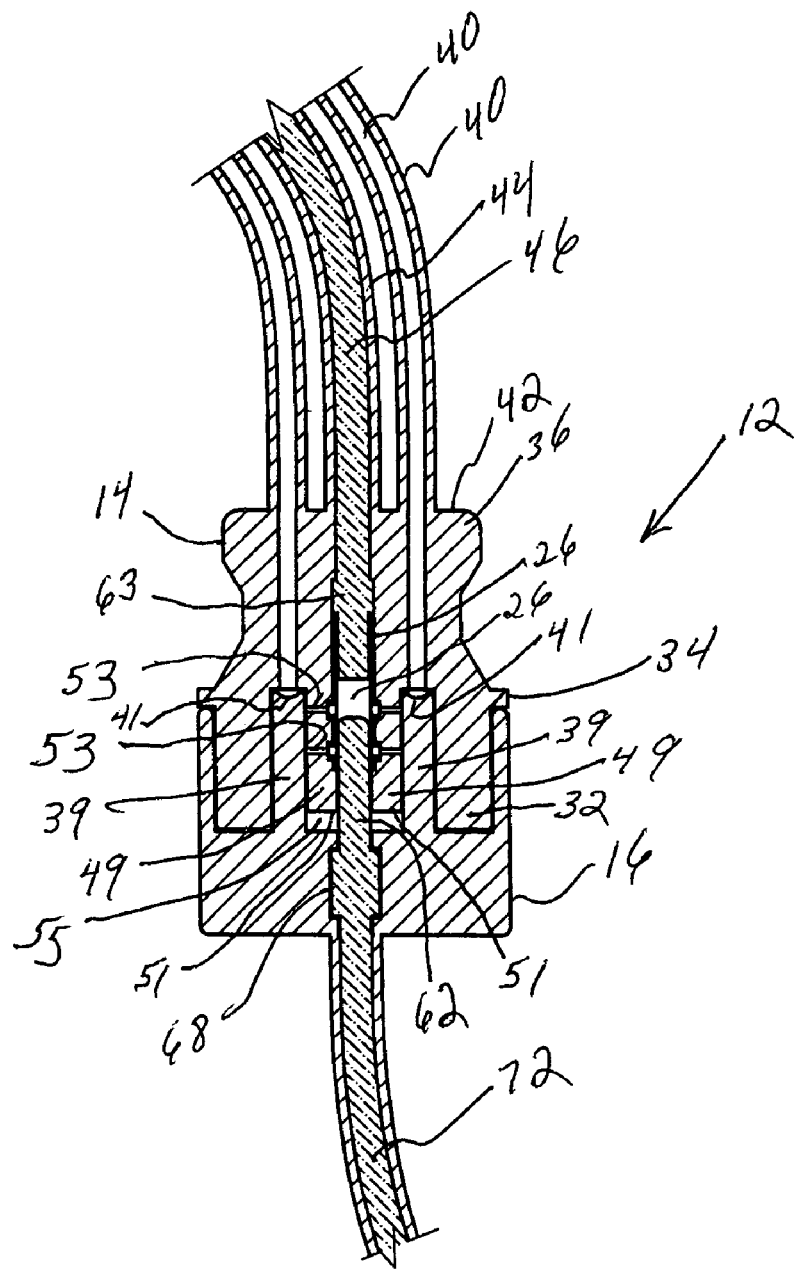
FIG. 10 is a front sectional view of the cable connector of FIG. 5, but with the first portion completely inserted into the second portion in accordance with the present invention.

When the magnitude of impact requires separation of the first and second portions 14 and 16, the microprocessor 30 signals the accelerometer 28 to "fire" the squib means 24 and provide an inert gas flow to the first portion 14 whereby the second portion 16 is forcibly ejected from the first portion 14 of the cable connector 12 and the area adjacent to the first portion 14 is blanketed with inert gas 31 (see FIG. 8) via a depressurized canister 18 thereby preventing electrical arcs that could start a fire, and displacing fuel vapors and/or oxygen that could maintain a fire.

The cable connector 12 is fabricated from plastic, rubber or similar non-conductive material capable of experiencing extreme vibrations and/or accelerations without deforming. The first and second portions 14 and 16 are disposed such that the first portion 14 is vertically above and adjacent to the second portion 16. The first portion 14 includes a rectangular configured (when taking a lower end view of the first portion 14) insertion end 32 that snugly inserts into a cooperatively configured connector recess 33 in the second portion 16 until a planar end wall 27 of the insertion end 32 congruently engages a planar bottom wall 29 of the connector recess 33 thereby providing a secure cable connector 12 irrespective of the vibrations encountered during operation of the vehicle. A none binding sealant such as silicone is generously applied to the engaging surfaces of the first and second portions 14 and 16 to provide a water tight seal to prevent corrosion, and to promote the separation of the first and second portions 14 and 16 irrespective of the time period from installation to actuation of the system 10. The first portion 14 further includes a guard ridge 34 peripherally disposed about the first portion 14 such that the guard ridge 34 engages an end ridge 35 of the second portion 16 upon inserting the insertion end 32 into the connector recess 33 thereby preventing dirt and other contaminants from entering the connector recess 33. The first portion 14 also includes a conduit end 36 having recessed side walls 37 that promote the manual gripping of the conduit end 36 while forcibly inserting the insertion end 32 into the connector recess 33.

The insertion end 32 of the first portion 14 includes two outer recesses 38 configured to snugly receive two plugging fingers 39 integrally formed in the connector recess 33 of the second portion 16. The outer recesses 38 are disposed on opposite sides of and equidistant from the recessed receptacle 26. The outer recesses 38 are separated from the recessed electrical receptacle 26 via isolation portions 49 that include recessed ends 51 and transverse gas apertures 53. The gas apertures 53 cooperate with relatively larger axially aligned apertures 90 through retaining hubs 92 of the receptacle 26 to promote inert gas flow from the outer recesses 38 into the cavity 94 in the receptacle 26 as a gap forms between the receptacle 26 and a rod 62 of the second portion 16 during separation of the first and second portions 14 and 16 when the vehicle impacts an object. Besides promoting inert gas flow, the retaining hubs 92 restrict movement of the electrical receptacle 26 relative to the isolation portions 49, thereby maintaining alignment and gas flow between the apertures 53 and 90 of the isolation portions and receptacle 49 and 26 as the second metal rod 62 is forcibly removed from the receptacle 26. Providing inert gas to the receptacle 26 during separation of the first and second portions 14 and 16, extinguishes an electrical arc formed when the coupled and energized receptacle and rod 26 and 62 are separated.

The recessed ends 51 of the isolation portions 49 cooperate with the outer recesses 38 to form a central recess 55 in the first portion 14. The central recess 55 promotes an inert gas "pocket" that surrounds the rod 62 of the second portion 16 as the rod 62 is removed from the receptacle 26 of the first portion 14 after the vehicle impacts an object. The inert gas pocket provides more arc extinguishing capability in the event that a relatively large arc forms between the receptacle and rod 26 and 62 during separation of the first and second portions 14 and 16, and the inert gas flow supplied by the gas apertures 53 to the receptacle 26 is insufficient to extinguish the arc. Further, the inert gas pocket prevents a flammable or explosive vapor surrounding the cable connector 12 from engaging an electrical arc formed between the receptacle and rod 26 and 62 during the separation of the first and second portions 14 and 16 of the cable connector 12.

The central axes of the recessed receptacle 26 and outer recesses 38 perpendicularly intersect the central longitudinal axis of the planar end wall 27 of the first portion 14. The alignment and spacing of the recessed receptacle 26 and outer recesses 38 cooperate to uniformly eject the second portion 16 from the first portion 14. The outer recesses 38 are joined to conduits 40 extending through the conduit end 36. The conduits 40 are connected to the inert gas canister 18 and ultimately supply highly pressurized inert gas from the canister to the recesses 38. The recesses 38 are cylindrically configured with diameters relatively larger than diameter of the conduits 40, the larger diameters of the recesses 38 cooperate with concave end walls 41 of the plugging fingers 39 forcibly inserted into the recesses 38, to increase the inert gas ejection force urged upon the end walls 41 of the plugging fingers 39 when the vehicle impacts an object. The increased ejection force quickly discharges both plugging fingers 39 simultaneously from the recesses 38 and completely separates the first and second portions 14 and 16, thereby preventing current flow from the battery 22 and electrically isolating the electrically energized recessed electrical receptacle 26 of the first portion 14.

The conduit end 36 of the first portion 14 includes a top wall 42 having an insulated electrical cable 44 with an inner electrically conductive wire 46 such as copper or similar conducting and non-corrosive metal extending therethrough. The insulated cable 44 extends vertically from the top wall 42. The copper wire 46 extends through the first portion 14, and is electrically joined to a top portion 45 of the recessed electrical receptacle 26. The recessed electrical receptacle 26 prevents an arc from the copper wire 46 to ground in the event that the first and second portions 14 and 16 are separated, and the bottom wall 27 of the first portion 14 is forcibly disposed adjacent to a grounded portion of the vehicle after impact. The electrical isolation of the conductive wire 46 coupled with the continued flow of inert gas from the container 18 reduces the possibility of fire a fire and/or explosion resulting from ruptured fuel lines disposing fuel proximate to the electrically energized wire 46. The conductive wire 46 ultimately connects the ungrounded terminal 20 of the twelve volt battery 22 or similar power source to a top portion 60 of an opposing electrically conductive cylindrical metal (preferably copper) rod 62 disposed in the connector recess 33 of the second portion 16. The lengths of the conduits 40 and cable 44 are minimized by disposing the cable connector 12 adjacent to the battery 22. Limiting the length of the conduits 40, reduces the possibility of damage to the conduits 40 after vehicle impact thereby maintaining inert gas flow to the first portion 14, and reduces the pressure drop of the inert gas as it flows through the conduits 40 thereby providing maximum inert gas pressure to the first portion 14 to eject the second portion 16 and then to blanket the proximate area with inert gas. Limiting the length of the cable 44, reduces the possibility of damage to the cable 44 after the vehicle impacts an object thereby avoiding an electrical arc from a damaged energized cable to ground which could initiate a fire should fuel be present due to vehicular damage after impacting the object.

The top portion 45 of the receptacle 26 in the conduit end 36 of the first portion 14 is crimped upon or otherwise forcibly joined to the copper wire 46 such that the receptacle 26 butts against a first ridge 96 of an enlarged end portion 63 of the copper wire 46. The first ridge 96 limits the insertion length of the copper wire 46 into the receptacle 26 thereby preventing the copper wire 46 from obstructing inert gas flow into the cavity 94 via the apertures 90 in the retaining hubs 92 of the receptacle 26. Further, the enlarged end portion 63 forms a second retaining ridge 64 that prevents the wire 46 from being loosened within or otherwise separated from the first portion 14 when the first portion 14 is forcibly inserted into the second portion 16.

The rod 62 disposed in the connector recess 33 of the second portion 16 is integrally joined to a top end 66 of a copper coupling 68 which includes a bottom end 70 integrally joined to a copper wire 72 that extends through and out of a bottom portion 74 of the second portion 16, the wire 72 being electrically protected outside of the bottom portion 74 by wire insulation 76. The rod 62 is sufficiently long to snugly insert into the recessed receptacle 26 via a cooperatively configured passageway 77 between the isolation portions 49 in a central portion of the insertion end 32 of the first portion 14. The coupling 68 forms opposing top and bottom retaining ridges 78 and 79. The top retaining ridge 78 prevents the metal rod 62 from "sticking" in the receptacle 26 while inert gas pressure forcibly separates the first and second portions 14 and 16, thus preventing the second portion 16 from sliding downward upon the insulation 76 of the copper wire 72 while the metal rod 62 remains in the receptacle 26. The bottom retaining ridge 79 prevents the second portion 16 from being pulled from or otherwise separated from the copper wire 72 when the first and second portions 14 and 16 are forcibly joined together. The copper wire 72 is appropriately sized to connect all vehicle electrical components (not pictured) to the ungrounded terminal 20 of the twelve volt battery or power source. To promote the separation of electrical portions, a lubricant such as silicone is liberally applied to engaging surfaces of the first and second portions 14 and 16 including slidably engaging surfaces of the receptacle 26 and the rod 62. The application of the lubricant must not "plug" or otherwise obstruct inert gas flow within the gas apertures 53.

Inert gas canisters or pressurized containers of inert gas 18 are commonly use for inflating an air bag in a vehicle and are well know to those or ordinary skill in the art. The pressurized containers 18 include gas pressure systems that quickly deliver the highly pressurized gas to the air bag to prevent injury to the automobile occupants. Examples of such gas pressure systems are disclosed in U.S. Pat. Nos. 4,971,354; 5,301,979 and 5,366,241. These gas pressure systems can be used in the present system 10 for separating the first and second portions of the cable connector, and for supplying an inert gas flow sufficient to blanket an area adjacent to the first portion of the cable connector to reduce the chance of a fire or explosion from occurring due to evaporating fuel disposed proximate to the vehicle-object collision. Further, the inert gas container of U.S. Pat. No. 5,301,979 includes an electrical squib and the corresponding components for initiating pressurized inert gas flow from the canister, the same can be utilized for the present system 10 for reducing the potential for fires when a vehicle impacts an object.

The present system 10 requires an impact sensing system such as an accelerometer 28 for detecting impact between the vehicle and the object. Accelerometers are used with air bag inflation systems in automobiles. U.S. Pat. No. 5,021,618 discloses an accelerometer capable of sensing impact and allowing an electrical current to flow (via a contact closure or similar means) which ultimately initiates inert gas flow. The electrical current is provided by a microprocessor 30 or similar electric signal generating system capable of providing sufficient electrical energy to fire the electrical squib 24 to ultimately initiate inert gas flow from the pressurized container 18 to the cable connector 12 whereby the first and second portions 14 and 16 of the cable connector 12 are separated a distance sufficient to interrupt electrical current, the inert gas flow continuing until the container 18 supplying the inert gas depressurizes thereby reducing the chance of a fire occurring by blanketing the area adjacent to the first portion 14 of the cable connector 12 with inert gas. Although an accelerometer 28 is the preferred device for sensing impact, alternative devices such as crumple zone sensors and limit switches (pressure, temperature, position, etc.), all well known to those of ordinary skill in the art, may be utilized.

Referring now to FIGS. 1, 6, 7 and 10, in operation, an inert gas canister 18, accelerometer 28 and microprocessor 30 are electrically connected and disposed proximate to a twelve volt battery 22 or other power source within a vehicle. A cable connector 12 having a first portion 14 electrically connected to an ungrounded terminal 20 of a twelve volt battery 22, and having a second portion 16 electrically connected to all electrical components in the vehicle, is mounted proximate to the twelve volt battery 22 such that the first portion 14 is secured to a predetermined portion of the vehicle with the end wall 27 facing downward. The second portion 16 is not secured to the vehicle, but instead, is secured to the first portion 14 via plugging fingers 39 snugly inserted into cooperating outer recesses 38 in the insertion end 32 of the first portion 14. A pair of conduits 40 connect the inert gas canister 18 to the outer recesses 38. The cable connector 12 is sized for electrical compatibility with an electrical system of a preselected vehicle. The canister 18 is sized and pressurized for the preselected vehicle to provide sufficient force to facilitate the separation of the first and second portions 14 and 16 of the cable connector 12; to provide sufficient inert gas volume to extinguish an electrical arc initiated by the separation of the first and second portions 14 and 16 of the cable connector 12; and to provide sufficient inert gas volume to blanket an area adjacent to the first portion 14 after the vehicle impacts an object. The sizing and pressuring of the canister 18 are well known to those of ordinary skill in the art. The accelerometer 28 is calibrated to "fire" the system 10 in the preselected vehicle upon preselected conditions being satisfied. The conditions include but are not limited to the weight of the vehicle, rate of de-acceleration of the vehicle, type of vehicle, use of the vehicle and type of objects typically encountered during ordinary use of the vehicle.

Referring now to FIGS. 1-5, 8 and 9, when the vehicle impacts an object, the accelerometer 28 provides a corresponding signal to the microprocessor 30 which then determines if the magnitude of impact requires inert gas flow from the canister 18 to the cable connector. If the microprocessor 30 determines that inert gas is required, the microprocessor 30 sends a signal to the accelerometer 28 which in turn causes an electrical squib 24 to fire, thereby allowing inert gas to flow from the canister 18 to the first portion 14. The inert gas pressure supplied to the first portion 14 of the connector 12 facilitates the ejection or discharge of the second portion 16 from the first portion 14 by uniformly "pushing" the plugging fingers 39 from the outer recesses 38. During the separation of the first and second portions 14 and 16, electrical continuity is broken and a spark resulting from the separation is suppressed by the inert gas. After the separation of the first and second portions 14 and 16, the electrically energized first portion 14 is held in place and isolated from grounded portions of the vehicle, the de-energized second portion 16 and electrical components connected thereto are of no consequence, and the inert gas canister 18 continues to discharge inert gas from the first portion 14 thereby blanketing a relatively large area and reducing the possibility of a fire or explosion resulting from evaporating fuel, present via ruptured fuel lines or fuel tanks, ultimately engaging a hot exhaust pipe or other "hot-spot."

Although not depicted, components may be added to enhance the operation of the system and method. The components are well known to those of ordinary skill in the art and include but are not limited to a manual override switch capable of preventing or starting inert gas flow from the pressurized container 18 to the cable connector 12, and a pressure indicator that provides an alarm when the internal pressure of the container 18 drops below a predetermined pressure. Further, a bellows may be attached to the guard ride 34 of the first portion 14 of the cable connector 12. The bellows would expand as the second portion 16 is separated from the first portion 14 thereby enclosing inert gas inside the connector 12 for a longer time period to completely extinguish an electrical arc before a flammable or explosive atmosphere is ignited. Also, the bellows would improve isolation of an energized recessed electrical receptacle 26 in the first portion 14 from grounded portions of the vehicle after impact with an object thereby reducing the possibility of an electrical arc and resultant fire and/or explosion after separation of the first and second portion 14 and 16 of the cable connector 12.

While this invention has been described with reference to its presently preferred embodiment, it is not limited thereto. Rather, the invention is limited only insofar as it is defined by the following set of patent claims and includes within its scope all equivalents thereof.

The invention claimed is:

1. A system for reducing the chance of fire and/or explosion when a vehicle impacts an object comprising:
   a cable connector having first and second portions that separate when predetermined conditions are satisfied;
   a pressurized container of inert gas that promotes the separation of said first and second portions of said cable connector, said first portion being connected to the ungrounded terminal of
   a battery in the vehicle, said second portion being connected to the electrical components of the vehicle;
   means for sensing impact between the vehicle and the object;
   means for extinguishing an electrical arc in said first portion of said cable connector while separating said first and second portions; and
   means for initiating inert gas flow from said pressurized container to said cable connector
   whereby said first and second portions of said cable connector are separated a distance sufficient to interrupt electrical current, said inert gas flow continuing until said container supplying said inert gas depressurizes thereby reducing the possibility of fire and/or explosion by blanketing the area adjacent to said first portion of said cable connector with inert gas wherein said first portion of said cable connector includes outer recesses for providing inert gas from conduits to plugging fingers of said second portion of said cable connector.

2. The system of claim 1 wherein said arc prevention means includes recessed receptacle that is electrically isolated when said first portion separates from said second portion of said cable connector thereby preventing an electrical arc from said first portion to ground.

3. The system of claim 1 wherein said plugging fingers include arcuate end walls for receiving inert gas pressure to promote the ejection of said second portion from said first portion of said cable connector.

4. The system of claim 1 wherein said impact sensing means includes an acceleration responsive switch.

5. The system of claim 4 wherein said acceleration responsive switch includes an accelerometer.

6. The system of claim 1 wherein said impact sensing means provides a signal corresponding to the collision force generated when the vehicle impacts an object.

7. The system of claim 1 wherein said inert gas flow initiating means includes a microprocessor.

8. The system of claim 7 wherein said inert gas flow initiating means includes a manual override switch capable of preventing or starting inert gas flow from said pressurized container to said cable connector.

9. The system of claim 1 wherein said inert gas container includes a pressure indicator that provides an alarm when the internal pressure of said canister drops below a predetermined pressure.

10. The system of claim 1 wherein said outer recesses include diameters relatively larger than the diameters of said conduits thereby increasing ejection force urged upon end walls of said plugging fingers to completely separate said first and second portions.

11. The system of claim 1 wherein said outer recesses are disposed on opposing sides of a recessed receptacle thereby providing an uniform distribution of ejection force upon said second portion.

12. The system of claim 1 wherein said first and second portions includes means for preventing conductive wires therein from being pulled from or otherwise damaging said first and second portions.

13. The system of claim 12 wherein said first portion prevention means includes an enlarged end portion of an internal conductive wire, and said second portion prevention means includes an enlarged conductive coupling.

14. The system of claim 1 wherein said first portion of said cable connector includes at least one isolation portion with a recessed end that cooperates with an outer recess of said first portion to form a central recess in said first portion to promote an inert gas pocket that surrounds a rod of said second portion of said cable connector as said rod is removed from an electrically energized member of said first portion, said inert gas pocket providing electrical arc extinguishing capability to said cable connector to extinguish an electrical arc formed between said electrically energized member of said first portion and said rod of said second portion when said first and second portions of said cable connector are separated thereby reducing the possibility of fire and/or explosion when the vehicle impacts an object.

15. A system for reducing the chance of fire and/or explosion when a vehicle impacts an object comprising:
a cable connector having first and second portions that separate when predetermined conditions are satisfied;
a pressurized container of inert gas that promotes the separation of said first and second portions of said cable connector, said first portion being connected to the ungrounded terminal of
a battery in the vehicle, said second portion being connected to the electrical components of the vehicle;
means for sensing impact between the vehicle and the object;
means for extinguishing an electrical arc in said first portion of said cable connector while separating said first and second portions; and
means for initiating inert gas flow from said pressurized container to said cable connector whereby said first and second portions of said cable connector are separated a distance sufficient to interrupt electrical current, said inert gas flow continuing until said container supplying said inert gas depressurizes thereby reducing the possibility of fire and/or explosion by blanketing the area adjacent to said first portion of said cable connector with inert gas wherein said first portion of said cable connector includes at least one isolation portion with at least one transverse gas aperture that cooperates with aligned apertures in a cylindrical side wall of a receptacle in said first portion to promote inert gas flow from an outer recess of said first portion into a cavity of said receptacle as a gap forms between said receptacle and a rod of said second portion of said cable connector when said first and second portions of said cable connector are separated thereby reducing the possibility of fire and/or explosion when the vehicle impacts an object.

16. A system for disconnecting an electrical power source in a moving vehicle when the moving vehicle is involved in a collision with an object comprising:
a cable connector having first and second portions that separate when predetermined conditions are satisfied, said first portion being connected to an ungrounded terminal of an electrical power source;
means for sensing a predetermined magnitude of impact of a moving vehicle with an object; and
means for initiating inert gas flow from an inert gas container to said first portion of said cable connector when a predetermined magnitude of impact is sensed whereby said first and second portions of said cable connector separate such that electrical arcs are extinguished and an adjacent area is blanketed with inert gas thereby reducing the possibility of a fire and/or explosion that may occur when a moving vehicle is involved in a collision wherein said first portion includes outer recesses for providing inert gas from conduits to plugging fingers of said second portion of said cable connector.

17. The system of claim 16 wherein said plugging fingers include arcuate end walls for receiving inert gas pressure to promote the ejection of said second portion from said first portion of said cable connector.

18. The system of claim 16 wherein said sensing means includes an acceleration responsive switch.

19. The system of claim 16 wherein said initiating means includes a microprocessor.

20. The system of claim 16 wherein said first portion includes an electrically conductive wire having an enlarged end portion for preventing the first portion from separating from the electrically conductive wire when the first portion and second portion are forcibly joined.

21. The system of claim 16 wherein said second portion includes an electrically conductive coupling having opposing top and bottom retaining ridges for maintaining the position of a conductive rod disposed in a connector recess in said second portion.

22. A method for reducing the possibility of fire and/or explosion when a vehicle is involved in a collision, said method comprising the steps of:
providing a cable connector having first and second members that are initially joined together, said first member being electrically connected to an ungrounded terminal of a battery;
providing means for forcibly separating said first and second members;
measuring the magnitude of force generated by a collision between a vehicle and an object;
initiating the forcible separation of said first and second members when said measured magnitude of force reaches a predetermined magnitude;

isolating an electrically energized portion of said first member to prevent electrical arcing after the vehicle engages an object; and blanketing the region proximate said first member with inert gas whereby the possibility of fires and/or explosions is reduced in the event fuel engages a hot spot.

23. The method of claim 22 wherein the step providing a cable connector includes the step of connecting said first member to a pressurized inert gas canister.

24. The method of claim 22 where the step of isolating said electrically energized portion includes the step of separating said electrically energized portion from a conductive rod disposed in a recess in said second member.

* * * * *